R. C. CLINKER.
APPARATUS FOR DETERMINING THE ACCELERATION OF ROTATING BODIES.
APPLICATION FILED AUG. 1, 1907.

1,024,183.

Patented Apr. 23, 1912.

2 SHEETS—SHEET 1.

Witnesses:

Inventor:
Reginald C. Clinker,
by
His Attorney.

R. C. CLINKER.
APPARATUS FOR DETERMINING THE ACCELERATION OF ROTATING BODIES.
APPLICATION FILED AUG. 1, 1907.

1,024,183.

Patented Apr. 23, 1912.

2 SHEETS—SHEET 2.

Witnesses:

Inventor:
Reginald C. Clinker,
by
His Attorney.

UNITED STATES PATENT OFFICE.

REGINALD C. CLINKER, OF RUGBY, ENGLAND, ASSIGNOR TO GENERAL ELECTRIC COMPANY, A CORPORATION OF NEW YORK.

APPARATUS FOR DETERMINING THE ACCELERATION OF ROTATING BODIES.

1,024,183.  Specification of Letters Patent.  Patented Apr. 23, 1912.

Application filed August 1, 1907. Serial No. 386,607.

*To all whom it may concern:*

Be it known that I, REGINALD C. CLINKER, a subject of the King of Great Britain, residing at Rugby, county of Warwick, England, have invented certain new and useful Improvements in Apparatus for Determining the Acceleration of Rotating Bodies, of which the following is a specification.

The object of my invention is to provide a simple and efficient instrument for the determination of the acceleration of rotating bodies suitable more particularly for use in measuring the cyclic acceleration of piston driven engines or the rate of loss of speed or "deceleration" of a turbine when under test for the purpose of determining the losses in the machine.

My invention is based on the principle that the torque required to change the speed of a rotating body is proportional to the rate of change or acceleration.

In carrying out the invention a rotatable body such as a fly-wheel is driven from the machine whose acceleration is to be measured through a connection which changes in length with change in torque applied to it, and a means is provided to determine the linear movement of the said rotating body produced by said changes in torque.

Figure 1:
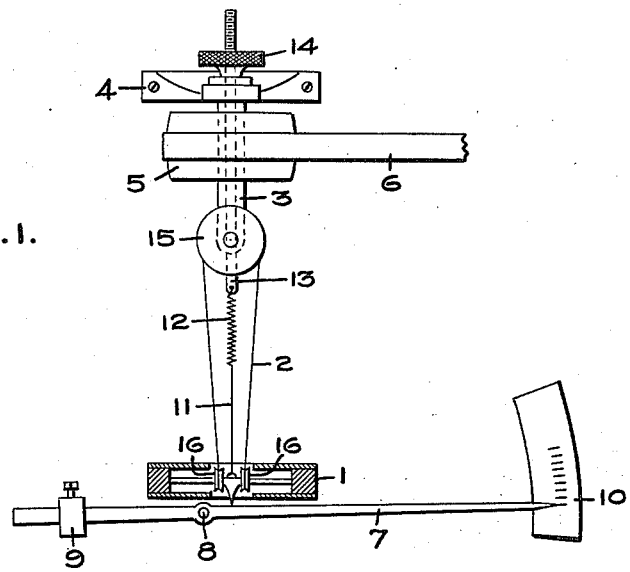
Figure 2:
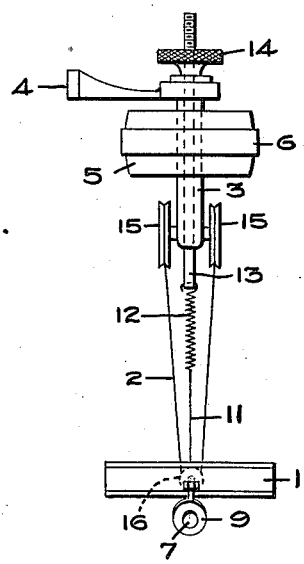
Figure 3:
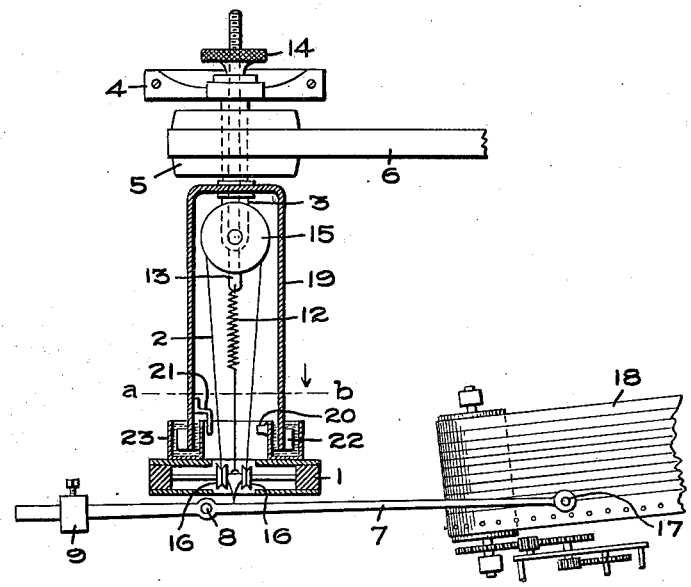
Figure 4:
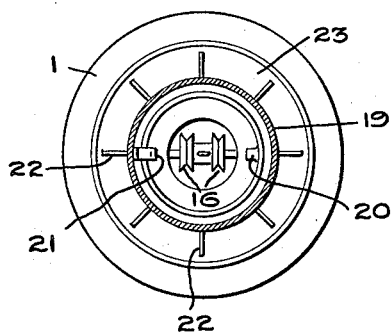

In the accompanying drawings illustrating an embodiment of my invention, Figure 1 is a front view of the apparatus with parts in section; Fig. 2 is a side view of the apparatus; Fig. 3 is a front view of a slightly modified form of the apparatus with certain parts in section; and Fig. 4 is a section on the line *a b* of Fig. 3, drawn on a somewhat larger scale.

In carrying my invention into effect, as shown I provide a mass in the form of a fly-wheel 1 which is supported by a quadrifilar suspension 2 from a vertical spindle 3 so as to be rotatable about a vertical axis. The spindle is mounted in a suitable bearing in a fixed bracket 4 or other suitable support and it may be fitted with a pulley 5 which is connected by a belt 6 to the shaft of the machine whose acceleration is to be tested, or the spindle may be geared to the shaft of the machine in any well-known manner. When the machine is in operation if the mass rotates frictionlessly it will tend to keep constant velocity. If, however, the speed of the machine changes, the mass will also change its speed but as this change must be accomplished through the suspension 2 it will be accompanied by a twisting or untwisting of the suspension threads and consequent raising or lowering of the mass. Any suitable well-known means may be employed for indicating or recording the linear movement of the mass. For example a pivoted arm or scale-pointer 7 may be provided which is fitted on one side of its pivot 8 with an adjustable counter-weight 9 tending to cause the pointer to move on its pivot and traverse a fixed scale 10, the mass or fly wheel 1 acting on the other arm of the pointer which forms a lever so as to prevent this movement so long as the rotational velocity remains constant, but allowing or causing angular movement of the pointer when the speed changes. The displacement of the mass may be recorded in any well-known manner if desired. Thus the arm 7 may be provided with a pen 17 that makes a record on the moving sheet or chart 18, Fig. 3.

In order to adjust the sensitiveness of the apparatus part of the weight of the rotatable mass may be taken by a suspension 11 of silk or other material of negligible torsion supported by a spring 12 from a vertical spindle 13 passing through the spindle 3 the tension of the spring being variable by means of a milled nut 14 into which the upper end of the spindle is screwed.

In practice it will be preferable to employ a quadrifilar suspension for the mass as shown consisting of an endless thread passing over four sheaves, one pair 15 being fixed to the lower end of the rotatable spindle and the other pair 16 to the mass. The axis of the one pair of sheaves is arranged at right angles to that of the other pair.

In order to reduce windage or air resistance the suspension may be inclosed in a tube 19, Figs. 3 and 4, which rotates with the spindle and the surface of the rotatable mass will also be made smooth. Projections 20 may be placed on the mass to engage similar projections 21 on the inside of the tube so as to limit the relative movement and prevent excessive twisting or breakage of the suspension.

In order to prevent relative oscillation between the mass and the upper part of the instrument a dash-pot may be employed, this dash-pot conveniently consisting of vanes 22, Figs. 3 and 4, attached to the lower end of the tube 19 and dipping into a circular oil bath 23 carried by the mass or wheel.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. A device for determining the acceleration of rotating bodies, comprising a rotating mass disposed substantially in a plane at right angles to its axis of rotation and rotating at a speed which bears a definite relation to that of the body whose acceleration is to be determined, means for causing the mass to move along said axis and thereby change the position of its plane of rotation as its rate of acceleration changes, and a device for indicating the change in position of said mass.

2. A device for determining the acceleration of rotating bodies, comprising a mass adapted to be rotated at a speed which bears a definite relation to that of the body whose acceleration is to be determined, a means for suspending the mass and transmitting motion thereto, and means for indicating any change in the length of the suspension.

3. A device for determining the acceleration of rotating bodies, comprising a mass that is adapted to be rotated, a flexible member for supporting and at the same time rotating the mass, said member changing in length with change in the torque applied to it, sheaves over which the member passes, an indicating device which assumes different positions for different accelerations of said mass, and means connecting said mass and device.

4. A device for determining the acceleration of rotating bodies, comprising a rotating member that has a fixed plane of rotation, a revolving mass whose plane of movement changes with speed variations, a flexible connection attached to the member which supports the mass and also rotates it, said connection changing in length with changes in the torque applied to it, a means for adjusting the sensitiveness of the mass to speed changes, a device whose position is determined by that of the revolving mass, and means connecting said mass and device.

5. In an apparatus of the character described, the combination of a rotating member, a revolving mass, a quadrifilar suspension for the mass which is attached to the rotating member, an indicator which has a tendency to move in one direction, and a device moving with the said mass which controls the movement of the indicator.

6. In an apparatus of the character described, the combination of a rotating member, a revolving mass, a quadrifilar suspension for the mass which is attached to the rotating member, and adjustable means for relieving said suspension of more or less of the weight of the mass, and an indicator sensitive to variations in position of said mass.

7. A device for determining the acceleration of rotating bodies comprising a driving member, a driven member, a suspension for the driven member composed of a material having negligible torsion, a connection between the two members that varies the position of the driven member as the acceleration varies, a device for indicating the changes in position of the driven member comprising a pointer and a weight, and a scale over which the pointer moves.

8. A device for determining the acceleration of rotating bodies, comprising a rotating member which has a fixed plane of rotation, a rotating mass whose plane of movement changes with speed variations, a flexible connection attached to the member, which connection supports and rotates the mass and changes its length when twisted by the relative movement of said member and said mass, means for limiting the extent of the movement of the mass relative to the member, a device for regulating the rate of said movement, and an indicator responsive to changes in the position of the mass.

9. In an apparatus of the character described, the combination of a rotating member, a revolving mass, sheaves carried by said member and said mass, a filar suspension for the mass which passes around the sheaves, and an indicator sensitive to variations in the position of said mass.

10. In an apparatus of the character described, the combination of a rotating member, a revolving mass, a filar suspension for supporting and rotating the mass from said member, said suspension changing in length with change in the torque applied to it, and an indicating device sensitive to variations in the position of said mass.

In witness whereof, I have hereunto set my hand this tenth day of July, 1907.

REGINALD C. CLINKER.

Witnesses:
CHARLES H. FULLER,
J. A. FOSTER.

Copies of this patent may be obtained for five cents each, by addressing the "Commissioner of Patents, Washington, D. C."